United States Patent [19]

Edelman et al.

[11] E Re. 29,134

[45] Reissued Feb. 8, 1977

[54] POLYIMIDE PRECURSOR AND METHOD AND COMPOSITION FOR PREPARING IT

[75] Inventors: Leonard E. Edelman; William M. Alvino, both of Pittsburgh, Pa.

[73] Assignee: Westinghouse Electric Corporation, Pittsburgh, Pa.

[22] Filed: Apr. 30, 1975

[21] Appl. No.: 573,285

Related U.S. Patent Documents

Reissue of:

[64] Patent No.: 3,853,813
Issued: Dec. 10, 1974
Appl. No.: 363,771
Filed: May 24, 1973

[52] U.S. Cl. ..... 260/47 CB; 260/32.6 N ; 260/63 N; 260/65; 260/77.5 R; 260/78 TF; 428/458; 428/474

[51] Int. Cl.² ..... C08G 73/10

[58] Field of Search ..... 260/47 CB, 78 TF, 63 N, 260/65, 77.5 R

[56] References Cited

UNITED STATES PATENTS

| | | | |
|---|---|---|---|
| 3,179,614 | 4/1965 | Edwards | 260/30.2 |
| 3,300,420 | 1/1967 | Frey | 260/2.5 |
| 3,489,696 | 1/1970 | Miller | 260/2.5 |
| 3,666,709 | 5/1972 | Suzuki et al. | 260/33.4 |
| 3,708,458 | 1/1973 | Alberino et al. | 260/65 |

*Primary Examiner*—Lester L. Lee
*Attorney, Agent, or Firm*—R. D. Fuerle

[57] ABSTRACT

A composition is disclosed of a dianhydride and a tetracarboxylic acid in the proportions of about 50 to about 70 mole % dianhydride to about 30 to about 50 mole % tetracarboxylic acid, a stoichiometric amount of an aromatic diisocyanate, and a solvent for the dianhydride, the tetracarboxylic acid, and the diisocyanate. A polyimide precursor is prepared by heating the composition at about 30° to 70° C until the evolution of carbon dioxide substantially ceases, and then at about 30° to about 100° C until its viscosity is about Q to about Z6 on the Gardner-Holdt viscosity scale at 18% solids. The polyimide precursor can be spread on a substrate and cured to produce a polyimide film or coated on a wire and cured to produce a polyimide wire enamel.

29 Claims, No Drawings

POLYIMIDE PRECURSOR AND METHOD AND COMPOSITION FOR PREPARING IT of pyromellitic dianhydride with 4,4'-diamino diphenyl ether to produce a

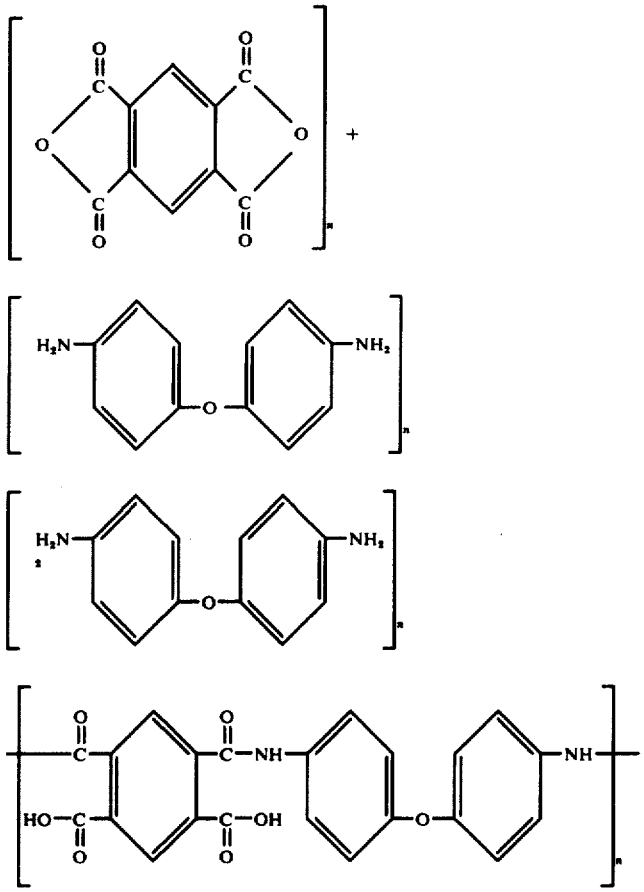

The polyamic acid cures to form the polyimide and a mole of water.

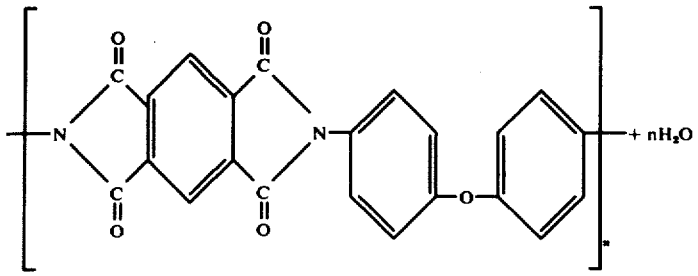

Matter enclosed in heavy brackets [ ] appears in the original patent but forms no part of this reissue specification; matter printed in italics indicates the additions made by reissue.

BACKGROUND OF THE INVENTION

In the commercial process for producing polyimides, such as those polyimides sold under the trademark "Kapton" by the Dupont Co., a dianhydride is reacted with a diamine to form an intermediate polyamic acid. The polyamic acid is then spread on a substrate and cured to form the polyimide. For example, the reaction The mole of water of condensation given off during the curing creates processing difficulties since it can make bubbles or blisters in the film as it evaporates.

Also, when the polyamic-acid is stored, some water is formed by closure of the imide ring as during cure. This water then attacks the polymer at another position which degrades the polymer and reduces its molecular weight. For this reason it is recommended that the polyamic-acid be refrigerated during storage.

PRIOR ART

In British patent 1,105,437 a tetracarboxylic acid, a diisocyanate, and a small amount of a dianhydride are reacted in a solvent to produce an insoluble precipitate.

Attempts to prepare polyimides from a dianhydride and a diisocyanate are described in an article by R. A. Meyers in the Journal of Polymer Science, Part A-1, Volume 7, pages 2,757 to 2,762 (1969) and in an article by Peter A. Carleton et al. in the Journal of Applied Polymer Science, Volume 16, pages 2983 to 2989 (1972).

SUMMARY OF THE INVENTION

We have discovered that if a dianhydride and a tetracarboxylic acid are mixed in the proportion of about 50 to about 70 mole percent dianhydride to about 30 to about 50 mole percent tetracarboxylic acid, they can react with an aromatic diisocyanate to produce a soluble polyimide precursor.

The principal advantage of the process of this invention over the present commercial process for preparing polyimides is the minimizing of the production of water of condensation during cure. Therefore, the hereinbefore-discussed problems of blistering, bubbling, and storage stability are minimized. The infrared spectrum and the properties of the polyimides of this invention indicate that they are identical to the polyimides prepared from the present commercial process using the same dianhydride and the diamine processing to the diisocyanate.

STARTING MATERIALS

Dianhydrides

The dianhydrides of this invention include dianhydrides of the general formula:

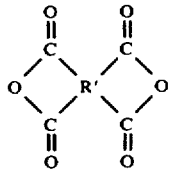

where R′ is tetravalent radical which consists of at least two carbon atoms and may be substituted or non-substituted aromatic group, a substituted or non-substituted aliphatic group, a substituted or non-substituted cycloaliphatic group, or a substituted or non-substituted heterocyclic group which contains at least one of the atoms N, O, or S, or different radicals which are bonded directly or by means of one of the following radicals: alkylene, dioxyalkylene, arylene, $-SO_2-$, $-O-$, $-CO-$,

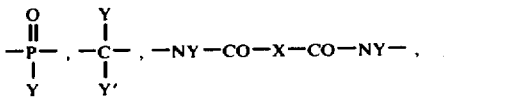

$-CO-NY-X-NY-CO-$, $-CO-O-X-O-CO-$, $-O-CO-X-CO-O-$, and $CO-NY-NY-CO-$, where X is a bivalent alkylene radical, dioxyalkylene radical, or-arylene radical, and Y and Y′ are alkyl radicals, aryl radicals, or cycloaliphatic radicals. The dianhydride is a carbonylated compound capable of forming an internal diimide which has two pairs of carbonylated groups, whereby each of said groups is bonded at one side to a carbon atom of a single tetravalent radical and at the other side to an oxygen atom, while the carbonylated groups, which belong to a single pair, are separated by three carbon atoms at most.

While non-ceromatic dianhydrides such as tetrahydrofuran tetracarboxylic acid dianhydride, cyclopentane tetracarboxylic dianhydride, or bicyclo-[2,2,2]-oceten-(7)-2,3,5,6-tetracarboxylic-2,3:5,6-dianhydride may be used, aromatic dianhydrides are preferred as they produce polyimides with far superior heat resistance. Examples of suitable aromatic dianhydrides include:

pyromellitic dianhydride
2,3,6,7-naphthalene tetracarboxylic dianhydride
3,3′,4,4′-diphenyl tetracarboxylic dianhydride
1,4,5,8-naphthalene tetracarboxylic dianhydride
1,2,5,6-naphthalene tetracarboxylic dianhydride
bis (3,4-dicarboxyphenyl) sulfone dianhydride
perylene 3,4,9,10-tetracarboxylic dianhydride
bis (3,4-dicarboxyphenyl) ether dianhydride
ethylene tetracarboxylic acid dianhydride
cyclopentadienyl tetracarboxylic acid dianhydride
3,4,3′,4′-benzophenone tetracarboxylic acid dianhydride
bis (3,4′-dicarboxyphenyl) 2,5-oxadiazole-1,3,4 dianhydride
bis (3′,4′-dicarboxyphenyl oxadiazole-1,3,4) paraphenylene dianhydride
(3′,4′-dicarboxyphenyl) 2-dicarboxy 5,6-benzimidazole dianhydride
(3′,4′-dicarboxyphenyl) 2-dicarboxy 5,6-benzoxazole dianhydride
(3′,4′-dicarboxyphenyl) 2-dicarboxy 5,6-benzothiazole dianhydride
bis (3′,4′-dicarboxydiphenylether) 2,5-oxadiazole 1,3,4 dianhydride The preferred dianhydrides are pyromellitic dianhydride and benzophenone tetracarboxylic dianhydride because they produce the toughest and most heat-resistant polyimides and the most flexible polyimide films. Mixtures of dianhydrides are also contemplated.

Tetracarboxylic Acids

The tetracarboxylic acids of this invention include tetracarboxylic acids of the general formula:

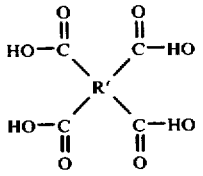

where R′ is as hereinbefore defined. Non-aromatic tetracarboxylic acids such as tetrahydrofuran tetracarboxylic acid, cyclopentane tetracarboxylic acid may be used but aromatic tetracarboxylic acids are preferred as they produce polyimides of far superior heat resistance. Examples of suitable aromatic tetracarboxylic acids include the tetracarboxylic acids corresponding to the aromatic dianhydrides hereinbefore listed. The preferred tetracarboxylic acids are pyromellitic tetracarboxylic acid and 3,3′,4,4′-benzophenone tetracarboxylic acid because they produce the toughest and most heat-resistant polyimides and the most flexible films. The tetracarboxylic acid used is preferably the corresponding tetracarboxylic acid to the dianhydride used since the acid can be easily prepared by adding water to the dianhydride. Mixtures of tetracarboxylic acids are also contemplated.

Aromatic Diisocyanate

The diisocyanate is an aromatic compound having two NCO groups. Only aromatic compounds are used as aliphatics do not produce polyimides of sufficient heat resistance. The following are examples of suitable diisocyanates:

4,4'-diisocyanato diphenyl 2,2-propane
4,4'-diisocyanato diphenyl methane
4,4'-diisocyanato benzidine
4,4'-diisocyanato diphenyl sulfur
4,4'-diisocyanato diphenyl sulfone
4,4'-diisocyanato diphenyl ether
4,4'-diisocyanato diphenyl 1,1-cyclohexane
oxides of methyl- and of bis (meta-isocyanato-phenyl) phosphine
diisocyanato 1,5-naphthalene
meta-phenylene diisocyanate
toluylene diisocyanate
dimethyl 3,3'-diisocyanato 4,4'-diphenylene
dimethoxy 3,3'-diisocyanato 4,4'-diphenylene
meta-xylene diisocyanate
para-xylylene diisocyanate
diisocyanato 4,4'-dicyclohexyl methane
hexamethylene diisocyanate
dodeca-methylene diisocyanate
diisocyanato 2,11-dodecane
bis (para-phenylene isocyanate oxadiazole-1,3,4) paraphenylene bis (para-phenylene isocyanate) oxadiazole-1,3,4
bis (meta-phenylene isocyanate) oxadiazole-1,3,4
bis (meta-phenylene isocyanate) 4-phenyl triazole-1,2,4
bis (4-paraphenylene isocyanate thiazole 2-yl) metaphenylene
(2-phenylene) benzimidazole 5,4'-diisocyanate
(2-phenylene) benzoxazole 5,4'-diisocyanate
(2-phenylene) benzothiazole 6,4'-diisocyanate
bis (2-phenylene isocyanate benzimidazole 6-yl) 2,5-oxadiazole-1,3,4
bis (para-phenylene isocyanate 2-benzimidazole 6-yl)
bis (para-phenylene isocyanate 2-benzoxazole 6-yl)

The preferred diisocyanate for producing a polyimide of maximum heat resistance is p,p'-diisocyanatodiphenylether. The preferred diisocyanate for producing a polyimide of good heat resistance, but at a lower cost is p,p'-diisocyanatodiphenylmethane. Mixtures of diisocyanates are also contemplated.

Solvent

The solvent is a solvent for the dianhydride, the tetracarboxylic acid, the diisocyanate, and the resulting polyimide precursor. Examples of suitable solvents include dimethylacetamide, N-methyl pyrrolidone, and dimethyl formamide. The preferred solvent is N-methyl pyrrolidone as it is less toxic than many of the other solvents. Also, it has a high boiling point which means that it evaporates slowly during cure which gives the polymer a chance to flow into the voids it leaves and therefore avoids blisters and craters.

The Process

A composition is prepared of the dianhydride and the tetracarboxylic acid in the proportions of about 50 to about 70 mole percent dianhydride to about 30 to about 50 mole percent tetracarboxylic acid, a stoichiometric amount of the aromatic diisocyanate, and sufficient solvent to produce a solution having a solids content of about 12 to about 25 percent. (All percentages herein are by weight unless otherwise indicated.) The proportion of dianhydride to tetracarboxylic acid is critical since if less dianhydride is used the polyamide becomes brittle and if more is used it becomes insoluble. The preferred range, which produces polyimides having the best properties, is about 60 to about 70 mole percent dianhydride to about 30 to about 40 mole percent tetracarboxylic acid. The preferred solids content of the composition is about 15 to about 25 percent. Although not preferred as it is usually unnecessary, up to about 1% of a catalyst may be included and may be helpful with some anhydrides. Suitable catalysts include tin salts such as stannous octoate and tertiary amines such as triethyl amine and benzyl dimethyl amine.

The composition may be prepared in many different ways. For example, the dianhydride and tetracarboxylic acid can be dissolved in the solvent and then the diisocyanate can be added. However, that method requires the purchase and storage of both dianhydride and tetracarboxylic acid which is troublesome and expensive. In the preferred method, which avoids that difficulty, the dianhydride is dissolved in the solvent and sufficient water is added to convert the proper amount of dianhydride to tetracarboxylic acid, then the diisocyanate is added. It is also preferred to add the diisocyanate last since the addition of diisocyanates directly to certain solvents (e.g., dimethylacetamide) produces a dark red solution which does not react well. Also, any water in the solvent may attack and destroy the diisocyanate. The diisocyanate should be added slowly since a rapid addition may produce a gel.

When preparing the composition it should be kept in mind that anhydride which has been exposed to moisture, even humid air, will already contain an amount of tetracarboxylic acid and that amount must be deducted from the amount of tetracarboxylic acid added or generated. Also, diisocyanates are known to trimerize and form an unreactive isocyanurate ring as they age which also should be taken into account.

The composition is heated at about 30 to about 70° C until the evolution of carbon dioxide substantially ceases which typically requires about 15 minutes. At less than about 30° C the reaction requires an impractically long time and at more than about 70° C the reaction tends to become uncontrollably violent and too much solvent is lost. About 40° to about 70° C is the preferred range.

The composition is then heated at about 30° to about 100° C until its viscosity is about Q to about Z6 on the Gardner-Holdt viscosity scale at 18 percent solids content. Of course, the actual solids content may be more or less than 18 percent and dilution or vacuum evaporation may be necessary to confirm that the viscosity is in the proper range at 18 percent solids. For the best film-forming and coating properties, the composition is preferably heated at about 70° to about 90° C until its viscosity is about Z to about Z6 on the Gardner-Holdt viscosity scale at 18 percent solids content. The polyimide precursor has now been formed.

To make a film the solids content of the polyimide precursor is adjusted by adding or evaporating solvent, if necessary, to form about a 10 to about a 20 percent solution. To form a film the polyimide precursor is spread on a substrate, such as a sheet of aluminum, and is cured as the sheet passes through an oven. The polyimide precursor may be used as a wire enamel by passing a wire through it prior to cure. Also, paper or a fabric can be coated with the polyimide precursor then cured to form an insulating sheet. The sheet or the film can be cut for use as electrical insulation, slot liners, etc.

The cure is typically done at about 100° to about 325° C for about ¼ to about 2 hours and preferably at about 275° to about 300° C for about ¼ to about ½ hours.

The following examples further illustrate this invention.

EXAMPLE 1

Into a reaction vessel was stirred 6.54 gms (0.03M) pyromellitic dianhydride, 5.08 gms (0.02M) pyromellitic acid, and 75 gms dry dimethylacetamide. The mixture was heated at 50° to 60° C and 5 drops benzyldimethylamine was added. Then 12.6 gms (0.05M) p, p'-diisocyanatodiphenylether was added in 4 increments in a period of 3 to 5 minutes with stirring at 50° to 60° C. The reaction started very quickly after the first addition and copious amounts of carbon dioxide were evolved. When all of diisocyanate was added, the mix was maintained at 50° to 60° C for another 10 to 15 minutes. The carbon dioxide evolution subsided, and the temperature was raised to 80° to 90° C for 10 to 15 minutes during which time the viscosity increased rapidly. The inherent viscosities of the polyimide precursor ranged from 0.50 to 1.1 dl/g. The Gardner-Holdt viscosities at 18 percent solids ranged from X to Z6. The solution was coated on an aluminum substrate and baked for 20 minutes at 150° C to produce a flexible film. The film remained flexible even when heated for prolonged periods at 325° C. An infrared analysis of the polyimide showed that it was identical to a polyimide prepared from pyromellitic dianhydride and 4,4'-diamino diphenylether.

EXAMPLE 2

10.9 grams (0.05M) of pyromellitic dianhydride was dispersed 75 grams dry dimethylacetamine. The 0.72 grams (0.04M) of water was added along with five drops of benzyldimethylamine. The reactants were heated to 50° C and all of the pyromellitic dianhydride dissolved. Then 12.6 grams p,p'-diisocyanatodiphenylether was added as in Example 1. The remainder of the reaction was carried out according to Example 1 of the properties of the polyimide were the same.

EXAMPLE 3

Same as Example 1, except that 12.5 (0.05M) of p,p'-diisocyanatodiphenylmethane was used as the diisocyanate. The polyimide precursor had a Gardner-Holdt viscosity of Z1. A good flexible film was formed.

EXAMPLE 4

5.8 grams (0.018M) of 3,3',4,4'-benzophenone tetracarboxylic dianhydride were dissolved in 45 grams dry dimethylacetamide at 50° to 60° C. Then 0.216 grams (0.012M) of water and five drops benzyldimethylamine were added to the solution and stirred for about 5 minutes. 7.56 grams (0.03M) of p,p'-diisocyanatodiphenylether were added in small increments over a period of 15 minutes while maintaining the temperature between 50° to 60° C. The carbon dioxide evolution gradually subsided and the viscosity of the reaction mixture increased rapidly to a Gardner-Holdt viscosity of Z3. Films were prepared from this solution of precursor by curing at 150° C for ¼ hours. The films were flexible and creasible.

EXAMPLE 5

Films were prepared from the polyimide precursor of Example 1 by passing the polyimide precursor onto a glass plate using a coating knife with an adjustable gap. The film was cured at 100° C for 15 minutes, then at 150° C for 15 minutes and removed from the plate. It was clamped on a metal frame and cured 10 minutes at 200° C and 10 minutes at 300° C. The dry film had a thickness of 1 to 1.5 mils. The film was tested and had the following properties: tensile strength 11,000 psi., elongation 8.5 percent, fold endurance (1.0 mils) > 300,000 cycles. After aging for 88 hours at 325° C the film was still creasible.

EXAMPLE 6

Example 1 was repeated using 72 mole % pyromellitic dianhydride, 28 mole % pyromellitic acid, and 100 mole % p,p,'-diisocyanatodiphenylether. The Gardner viscosity of the polyimide precursor was Z1 and the inherent viscosity was 0.79 dl/g. Films were prepared as Example 5. The films were flexible and had good properties.

EXAMPLE 7

Using the procedure of Example 1, a polyimide precursor was prepared from 60 mole % pyromellitic dianhydride, 40 mole % pyromellitic acid, and 100 mole % p,p'-diisocyanatodiphenylether. In this example, the isocyanate was added all at once at the beginning of the reaction. The polyimide precursor has an inherent viscosity of 0.48 dl/g. Flexible films were prepared from the polyimide precursor as in Example 5.

EXAMPLE 8

In a series of experiments, the ratio of pyromellitic dianhydride to pyromellitic acid was varied to determine the extent of reaction by measuring the amount of carbon dioxide evolved. In addition, inherent viscosity and film properties were also measured. The procedure used in this series of reaction was essentially that described in Example 1, except that the isocyanate was added all at once at the beginning of the reaction. The amount of carbon dioxide evolved was measured by trapping the gas in a pre-weighed tube filled with a $CO_2$ alkaline absorbent sold by Fisher Scientific Co. under the trademark "Ascarite," then reweighing the tube. The results of these experiments are shown in the following table:

| Mole % PMDA PMA | % $CO_2$ Evolved | Inherent Viscosity | Gardner Viscosity | Film Properties |
|---|---|---|---|---|
| 0/100 | 64 | — | < A | Brittle |
| 20/80 | 75 | 0.17 | < A | Brittle |
| 30/70 | 83 | | | |
| 45/55 | 88 | 0.28 | B | Brittle |
| 50/50 | 90 | 0.37 | I | Brittle |
| 60/40 | 88 | 0.48 | | Flexible |
| 70/30 | 89 | — | gelled | — |
| 80/20 | 80 | — | gelled | — |
| 100/0 | 76 | — | gelled | — |

The above table shows the synergistic interaction between PMDS and PMA in the evolution of carbon dioxide which is an indication of the extent to which the polyimide precursor has been formed. The mole ratio at which maximum carbon dioxide evolution was obtained does not quite coincide with the critical ratio required by this invention due to the fact that the isocyanate was added all at once to the reaction rather than in small increments.

We claim:

1. A method of making a soluble polyimide precursor comprising:

1. preparing a composition which comprises:
   (a) a dianhydride and a tetracarboxylic acid in the proportions of about 50 to about 70 mole percent dianhydride and about 30 to about 50 mole percent tetracarboxylic acid;
   (b) a stoichiometric amount of an aromatic diisocyanate; and
   (c) a solvent for said dianhydride, said tetracarboxylic acid, said aromatic diisocyanate, and said polyimide precursor in an amount sufficient to make a solution having a solids content of about 12 to about 25 percent;
2. heating said composition at about 30 to about 70° C until the evolution of carbon dioxide substantially ceases; and
3. heating said composition at about 30 to about 100° C until its viscosity is about [ Z ] *Q* to about Z6 on the Gardner-Holdt viscosity scale at 18 percent solids.

2. A method according to claim 1 wherein the proportion of dianhydride to tetracarboxylic acid is about 60 to about 70 mole % dianhydride and about 30 to about 40 mole % tetracarboxylic acid.

3. A method according to claim 1 wherein said composition in step (2) is heated at about 40° to about 70° C until the evolution of carbon dioxide substantially ceases.

4. A method according to claim 1 wherein said composition in step (3) is heated at about 70 to about 90° C until its viscosity is about Z to about Z6 on the Gardner-Holdt viscosity scale at 18 percent solids.

5. A method according to claim 1 wherein said dianhydride and said tetracarboxylic acid are aromatic.

6. A method according to claim 5 wherein said dianhydride is selected from the group consisting of pyromellitic dianhydride, 3,3′,4,4′-benzophenone tetracarboxylic dianhydride, and mixtures thereof, and said tetracarboxylic acid is selected from the group consisting of pyromellitic tetracarboxylic acid, 3,3′,4,4′-benzophenone tetracarboxylic acid, and mixtures thereof.

7. A method according to claim 1 wherein said aromatic diisocyanate is p,p′-diisocyanatodiphenylether.

8. A method according to claim 1 wherein said aromatic diisocyanate is p,p′-diisocyanatodiphenylmethane.

9. A method according to claim 1 wherein after step (3) said composition is spread on a substrate and cured to form a film.

10. A method according to claim 1 wherein after step (3) said composition is coated on a paper or fabric and cured to form an insulating sheet.

11. A method according to claim 1 wherein after step (3) said composition is coated on a wire and cured to form a wire enamel.

12. A method according to claim 11 wherein said composition is cured at about 275° to about 300° C.

13. A method according to claim 1 wherein said composition is formed by mixing said dianhydride with said solvent, adding water to form said tetracarboxylic acid, then adding said aromatic diisocyanate.

14. A composition comprising:

1. a dianhydride and a tetracarboxylic acid in the proportions of about 50 to about 70 mole % dianhydride and about 30 to about 50 mole % tetracarboxylic acid;
2. a stoichiometric amount of an aromatic diisocyanate; and
3. a solvent for said dianhydride, said tetracarboxylic acid and said diisocyanate.

15. A composition according to claim 14 wherein the proportion of dianhydride to tetracarboxylic acid is about 60 to about 70 mole % dianhydride and about 30 to about 40 mole % tetracarboxylic acid.

16. A composition according to claim 14 wherein said dianhydride and said tetracarboxylic acid are aromatic.

17. A composition according to claim 16 wherein said dianhydride is selected from the group consisting of pyromellitic dianhydride, 3,3′,4,4′-benzophenone tetracarboxylic dianhydride, and mixtures thereof, and said tetracarboxylic acid is selected from the group consisting of pyromellitic tetracarboxylic acid, 3,3′,4-,4′-benzophenone tetracarboxylic acid, and mixtures thereof.

18. A composition according to claim 14 wherein said aromatic diisocyanate is p,p′-diisocyanatodiphenylether.

19. A composition according to claim 14 wherein said aromatic diisocyanate is p,p′-diisocyanatodiphenylmethane.

20. An polyimide precursor made according to the method of claim 1.

21. A polyimide precursor according to claim 20 wherein said dianhydride and said tetracarboxylic acid are aromatic.

22. A polyimide precursor according to claim 21 wherein said dianhydride is selected from the group consisting of pyromellitic dianhydride, 3,3′,4,4′-benzophenone tetracarboxylic dianhydride, and mixtures thereof, and said tetracarboxylic acid is selected from the group consisting of pyromellitic tetracarboxylic acid, 3,3′,4,4′-benzophenone tetracarboxylic acid, and mixtures thereof.

23. A polyimide precursor according to claim 20 wherein said aromatic diisocyanate is p,p′-diisocyanatodiphenylether.

24. A polyimide precursor according to claim 20 wherein said aromatic diisocyanate is p,p′-diisocyanatodiphenylmethane.

25. A method according to claim 1 wherein after step (3) said composition is cured about 100° to about 375° C. for about 1 to about 2 hours.

26. A method according to claim 22 wherein said composition is cured at about 275° to about 300° C for about ¼ to about ½ hour.

27. A method according to claim 1 wherein said solvent is N-methyl pyrrolidone.

*28. A method according to claim 1 wherein said composition includes up to about 1% of a catalyst.*

*29. A composition according to claim 14 which includes up to about 1% of a catalyst.*

* * * * *